(12) United States Patent  (10) Patent No.: US 8,345,430 B2
Tochi et al.  (45) Date of Patent: Jan. 1, 2013

(54) IC CARD

(75) Inventors: Akihiro Tochi, Kanagawa (JP); Masaki Tsujimoto, Yokohama (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 281 days.

(21) Appl. No.: 12/656,076

(22) Filed: Jan. 15, 2010

(65) Prior Publication Data

US 2010/0182756 A1 Jul. 22, 2010

(30) Foreign Application Priority Data

Jan. 19, 2009 (JP) ................. 2009-009176

(51) Int. Cl.
H05K 1/14 (2006.01)
(52) U.S. Cl. ...................................... 361/737
(58) Field of Classification Search .................. 361/737, 361/801–803; 257/678, 679
See application file for complete search history.

(56) References Cited

U.S. PATENT DOCUMENTS 5,886,402 A * 3/1999 Onoda et al. .................. 257/679

FOREIGN PATENT DOCUMENTS

| JP | 10-287068 A | 10/1998 |
|---|---|---|
| JP | 11-149539 A | 6/1999 |
| JP | 11-154208 A | 6/1999 |
| JP | 2000-133968 A | 5/2000 |
| JP | 2001-518652 A | 10/2001 |
| JP | 2001-521652 A | 11/2001 |
| JP | 2002-513482 A | 5/2002 |
| JP | 2002-279388 A | 9/2002 |
| JP | 2005-158808 A | 6/2005 |
| JP | 2007-072933 A | 3/2007 |
| JP | 2007-193809 A1 | 8/2007 |
| WO | WO-97/44990 A1 | 11/1997 |
| WO | WO-98/20451 A1 | 5/1998 |
| WO | WO-99/09796 A2 | 2/1999 |
| WO | WO-2005/088697 A | 9/2005 |

* cited by examiner

*Primary Examiner* — Jeremy Norris
*Assistant Examiner* — Tremesha S Willis
(74) *Attorney, Agent, or Firm* — Rader, Fishman & Grauer PLLC

(57) ABSTRACT

An IC card includes a frame of a rectangular border-shape, a printed circuit board, and one pair of shells. The printed circuit board is disposed on an interior portion of the frame and equips an electronic component. The one pair of shells cover the area surrounded by the frame with both faces of the shells, and constitute an outer shell of the IC card. One of the shells has a plurality of intermittent bent pieces on a periphery thereof. The bent pieces face an edge portion of the frame. The bent pieces establish one pair of hook pieces which protrude from a plate thickness surface (a flat side) on a front end portion thereof. Ultrasonic vibration is applied to a front end portion of the bent pieces while an edge portion of the frame is subjected to pressure, joining the bent pieces to the frame.

6 Claims, 8 Drawing Sheets

IC CARD

This application is based on and claims the benefit of priority from Japanese Patent Applications No. 2009-009176, filed on 19 Jan. 2009, the content of which is incorporated herein by reference.

BACKGROUND OF THE INVENTION

1. Field of the Invention

The present invention relates to an IC card. In particular, it relates to a structure of IC cards such as CFast that connect to a slot installed on a computer.

2. Related Art

For example, in order to expand functionality of a personal computer (hereinafter, referred to as a "PC"), an expansion card, in which a connector is added to a printed circuit board that has been equipped with a microcomputer, is connected to an expansion slot of a PC. The CFast card is one type of expansion card standardized for a PC, and connects to a PC, achieving high speed communication.

Although the CFast card is one type of IC card, a printed circuit board equipped with a microcomputer is housed in a rigid body frame thereof. Accordingly, the CFast card can be classified as a different microcomputer card from a memory card in which a memory chip is sealed within a plastic package. Furthermore, in recent years, a CFast card equipped with a keyboard has appeared, and CFast cards can also be classified as multifunction cards.

Such IC cards have a printed circuit board disposed on an interior portion of a rectangular flat frame. The frame has a connector electrically connected to the printed circuit board, and both sides of the connector and the frame are covered by a metal plate shell, thereby constituting a rigid outer shell.

An IC card having such a structure is disclosed in, for example, Japanese Unexamined Patent Application Publication No. 2002-279388 (hereinafter called "Patent Document 1"). Patent Document 1 discloses an IC card and manufacturing method thereof in which irregularities in bonding strength between a metal plate shell and a synthetic resin frame are eliminated, resulting in having a more stable and robust bonding force, and allowing for a reduction in a manufacturing cost.

The IC card according to Patent Document 1 has a printed circuit board including an electronic component in an interior portion thereof, and is formed by covering a synthetic resin frame with a metal plate shell. Then, the frame forms a groove for fitting the shell on a side bordered by the shell. Furthermore, on the shell is established a protruding portion which is inserted into the groove. The protruding portion is shaped such that a front end section is wider than a base section. In addition, the groove of the frame and the protruding portion established on the end face of the shell are joined by ultrasonic welding (pressure welding).

The IC card according to Patent Document 1 is such that the metal plate shell is composed of stainless steel, and a plate thickness is 0.1 mm to 0.2 mm. Furthermore, the IC card according to Patent Document 1 is such that, if a groove portion of a frame on a protruding portion is subjected to pressure and vibrated with ultrasonic waves, then a portion of a synthetic resin frame hardens after welding, allowing the protruding portion to be joined.

However, the IC card according to Patent Document 1 is such that, although welded synthetic resin flows into a base portion of the protruding portion, the plate thickness of the protruding portion is so thin that the protruding portion easily peels off from the frame. It is believed that when a force to separate from the frame acts upon the shell, the protruding portion destroys the welded portion of the frame in a manner similar to a thin blade slicing the frame, and there is a problem in that a joining strength between the shell and the frame is insufficient.

SUMMARY OF THE INVENTION

The present invention was created in view of such problems as the above, and has an objective of providing an IC card for which the joining of a sheet metal shell to a synthetic resin frame has sufficient binding strength.

An IC card according to an aspect of the present invention includes a frame of a rectangular border-shape composed of synthetic resin; a printed circuit board that is disposed on an interior portion of the frame and equips an electronic component; and one pair of shells that constitutes an outer shell, the shells being composed of a metal plate, and covers an area surrounded by the frame, in which one of the shells of the one pair of shells has a plurality of intermittent bent pieces, which are intermittent, facing an edge portion of the frame on a periphery thereof, one of the bent pieces establishes a stopper that protrudes from a plate thickness surface thereof on a front end portion, and the plurality of bent pieces are joined to the frame by being partially inserted into the frame after application of pressure and ultrasonic vibration to the front end portion of the edge portion of the frame and inclusion of the stopper.

In the IC card according to the above-described aspect, the stopper may include one pair of hook pieces opposing each other at which both wings of the front end portions of the bent pieces are bent.

In the IC card according to the above-described aspect, the stopper may include one pair of inclined pieces that opens at an angle from a front end portion of the bent pieces facing toward a base end portion thereof.

In the IC card according to the above-described aspect, the stopper may have a curved surface on a front end portion of the bent pieces, and include an embossment having a difference in level on a base end portion of the bent pieces.

In the present invention, the frame preferably has insulation properties, an insulating frame may indicate a frame composed of nonconductive material, and an insulating frame of desired shape can be obtained by molding synthetic resin. The frame is not limited to a single-body frame. A frame in which one pair of frames is superimposed and joined, and open on one side is also included in the present invention. It should be noted that a frame open on one side indicates that one side is partially eliminated.

The printed circuit board may be disposed in a space surrounded by the frame, a connector, and one pair of conductive shells, and disposed in an interior portion of the frame by way of insertion, holding, storing, or the like. For example, another end portion of a plurality of contacts may be "soldered" to an edge connector (also called a "print contact") that has been established on the printed circuit board, and as a result, the printed circuit board may be fixed to an interior portion of the frame. An electronic component may preferably be surface-mounted on one surface of a printed circuit board, and by selecting an electronic component of low mounting height, a low-profile IC card may be created.

The one pair of shells should preferably be composed of a metal plate of thin plate thickness, in which one side is bent perpendicularly, in which one of the shells may interleave in latching onto an edge portion of the frame, and another shell may interleave in latching onto a plate thickness surface thereof, and cover both sides of the printed circuit board, mechanically connecting the connector and the frame. The shell plates may constitute an outer shell of the IC card, and also function as shield plates blocking unwanted electromagnetic waves.

For the one pair of shell plates, stainless steel plates having a corrosion preventing effect may preferably be used; for example, steel plates coated with chrome are also acceptable. Furthermore, for the one pair of shell plates, in order to prevent the inner wall thereof from short circuiting to the pattern side (wired side) of the printed circuit board, an insulating film may be partially applied.

For the stopper, a protrusion from a plate thickness surface of a bent piece is important. More preferably, the stopper can be realized in such an aspect as the above-described by one pair of hook pieces, one pair of inclined pieces (lances), an embossment, or the like. For the shell, a developed metal plate is molded, allowing a desired shape to be obtained, and for the stopper, press-molding may be preliminarily performed on the developed metal plate, and then the bent pieces may be processed by bending, and depending on the shape, the stopper and the bent pieces can be collectively processed by molding.

If ultrasonic vibration is applied to a front end portion of the bent pieces while an edge portion of the frame is subjected to pressure, friction occurs between the front end portion of the bent pieces and the frame, and a portion of the frame fluidizes, allowing the bent pieces including the stopper to be inserted partially into the frame. Then, as a result of solidification of the fluidized portion, the bent pieces can be joined to the frame.

Although ultrasonic welding is, in a broad sense, welding, unlike welding (also called "fusion welding"), in which at least two materials are heated and welded, it is classified as pressure welding, in which at least two materials are subjected to pressure and joined. Moreover, ultrasonic welding is classified as unheated pressure welding, and is considered to join by causing elastic deformation or plastic deformation (fluidization) to a material, using ultrasonic wave energy. Ultrasonic welding is unheated welding, and therefore, deterioration of a connecting portion is claimed to be low.

DETAILED DESCRIPTION OF THE INVENTION

In order to realize an IC card of thin type with rigidity, the inventors devised establishing a stopper (a barb) which protrudes from a plate thickness surface (a flat side) on interleaving bent pieces established on a periphery of a shell, and ultrasonically to weld the bent pieces to the frame. As a result, it is possible to join a sheet metal shell to a synthetic resin frame with sufficient binding strength. Hereinafter, embodiments of the present invention are explained with reference to the drawings.

First Embodiment

First, a configuration of an IC card according to a first embodiment of the present invention is explained.

Figure 1:
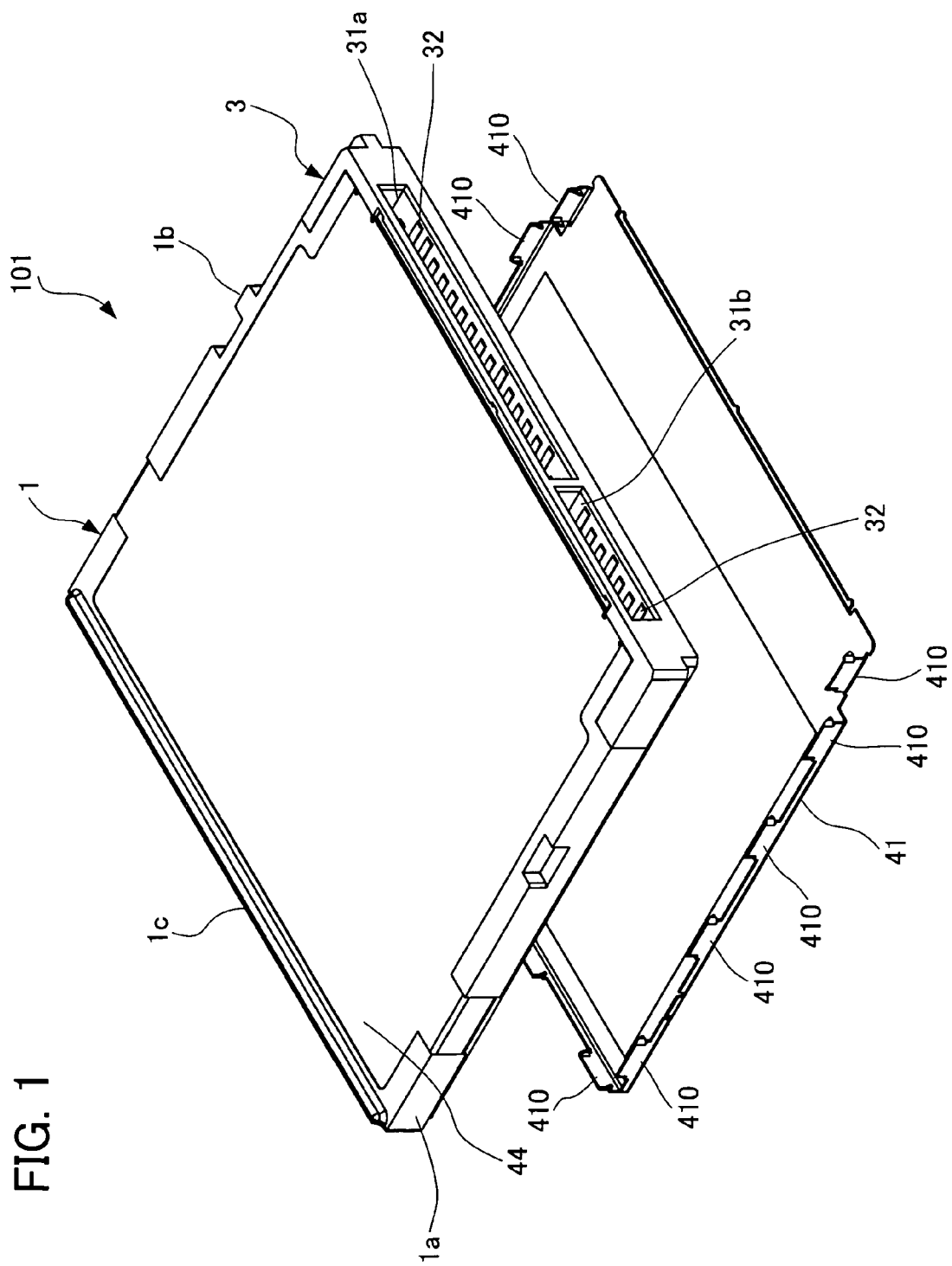
FIG. 1 is a first perspective view showing an exterior of an IC card according to a first embodiment of the present invention.
Figure 2:
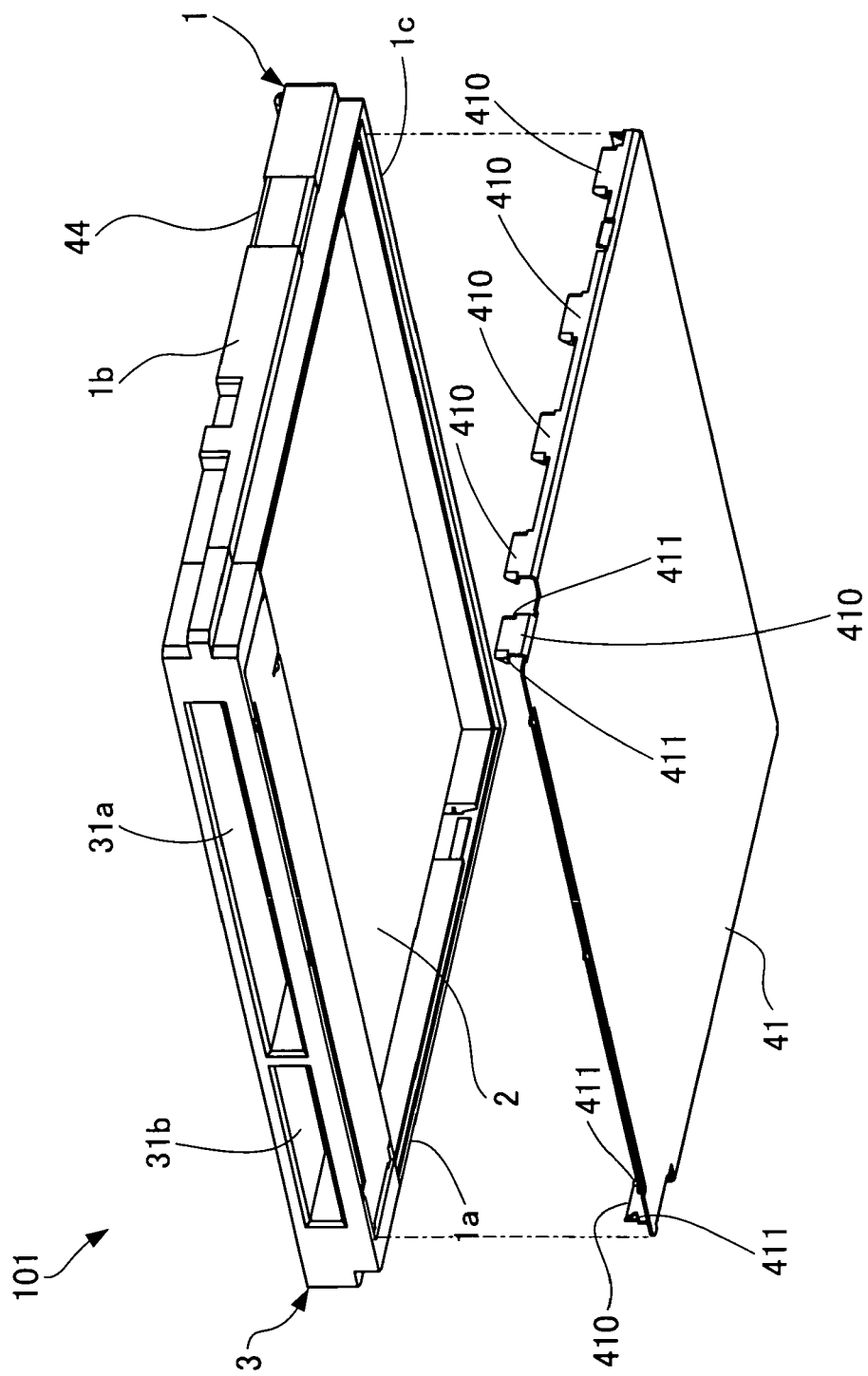
FIG. 2 is a second perspective view showing an exterior of the IC card according to the first embodiment.
Figure 3:
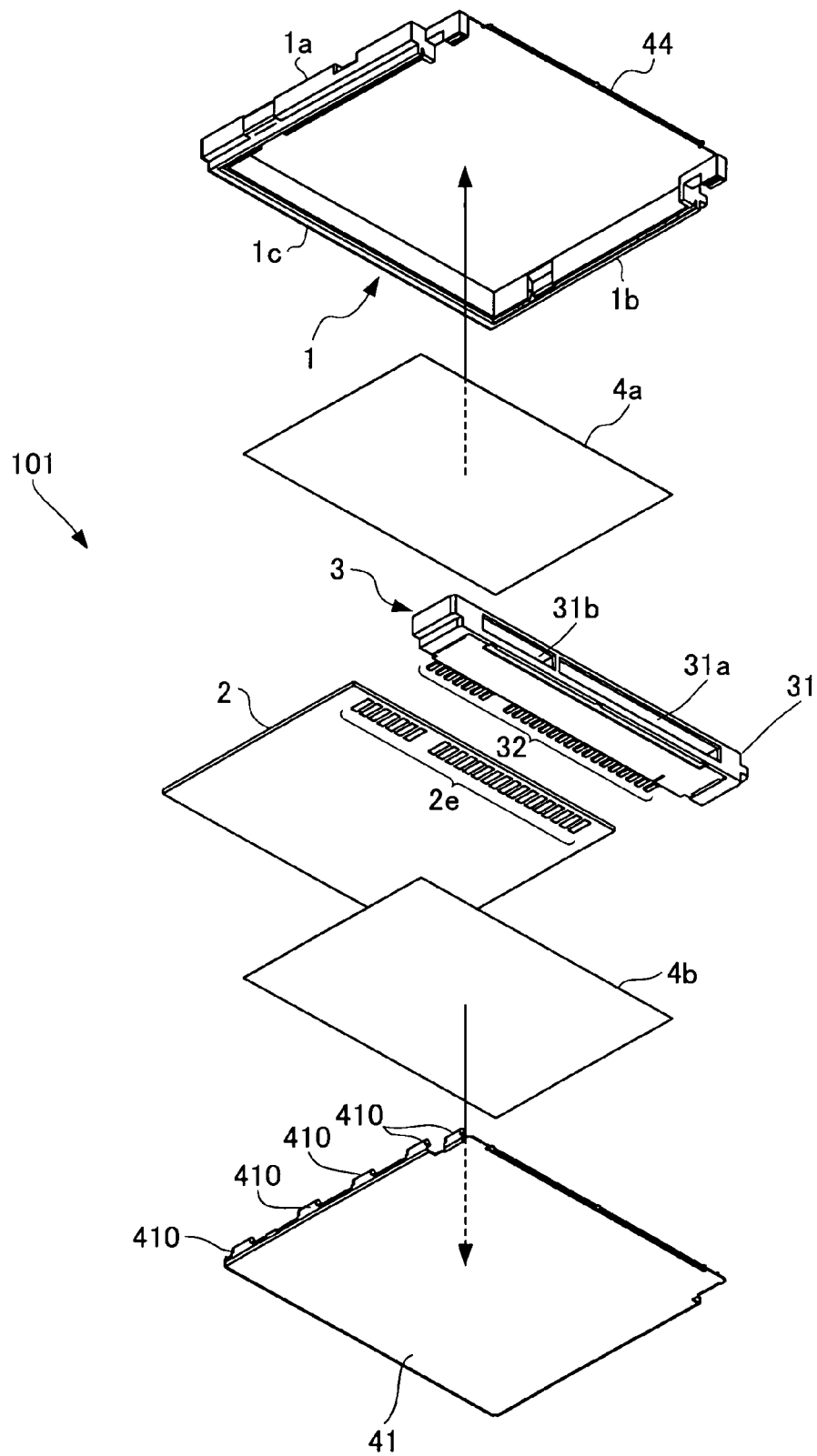
FIG. 3 is a first perspective exploded view showing the IC card according to the first embodiment.
Figure 4:
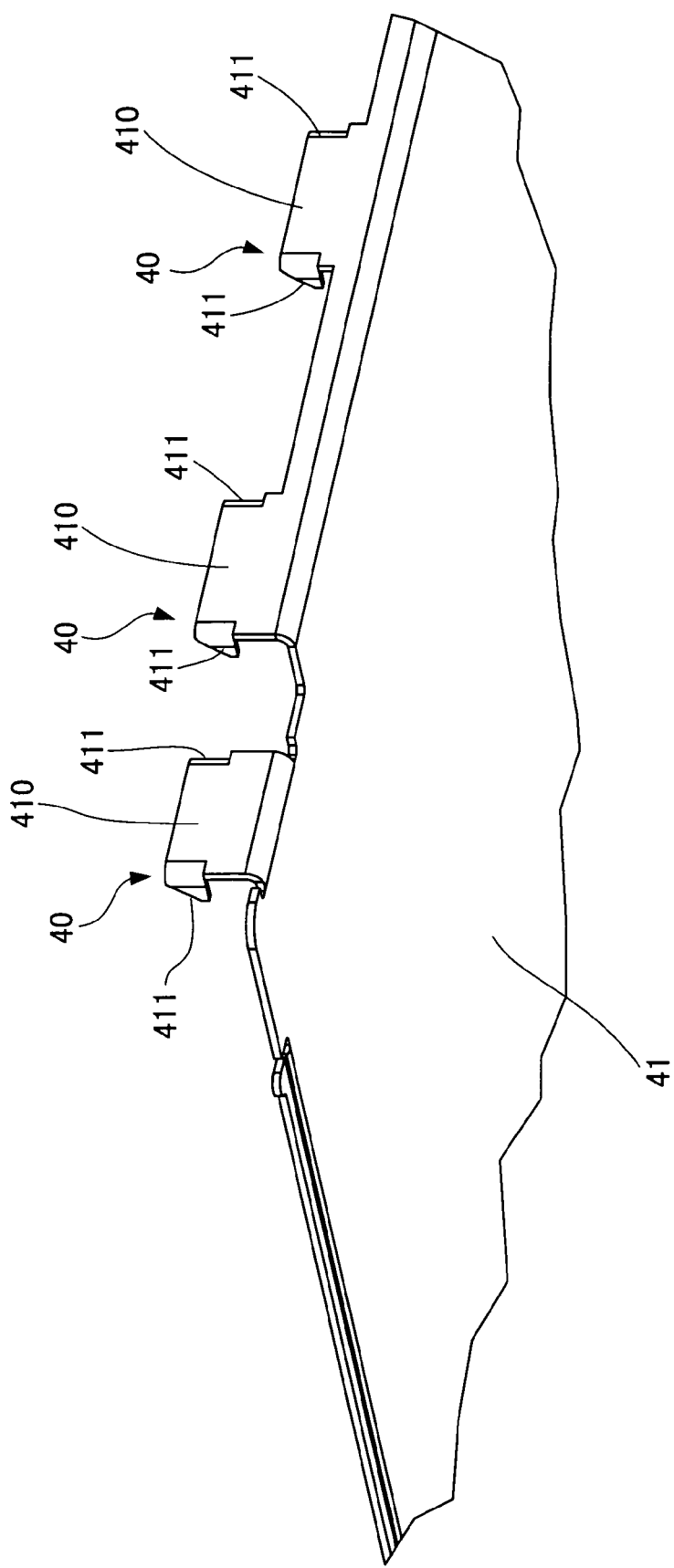
FIG. 4 is a perspective view showing an exterior of a main portion of one shell equipped to the IC card according to the first embodiment.

FIG. 1 is a first perspective view showing an exterior of an IC card according to a first embodiment of the present invention. FIG. 2 is a second perspective view showing an exterior of the IC card according to the first embodiment, in which the IC card is seen from a different direction than in FIG. 1. FIG. 3 is a first perspective exploded view showing the IC card according to the first embodiment. FIG. 4 is a perspective view showing an exterior of a main portion of one shell equipped to the IC card according to the first embodiment.

In reference to FIGS. 1 through 4, the IC card 101 according to the first embodiment includes a frame 1 of a rectangular border-shape, a printed circuit board 2, a plate-shaped connector 3, and one pair of conductive shell plates 41 and 44.

In reference to FIGS. 1 through 4, the frame 1 is composed of synthetic resin, and is open on one side. The printed circuit board 2 is disposed on an interior portion of the frame 1, and equips an electronic component which is not shown. The connector 3 constitutes one side of the frame 1. The one pair of shells 41 and 44 are composed of metal plate, cover the area surrounded by the frame 1 with both faces of the shells 41 and 44, and constitute an outer shell of the IC card 101.

In reference to FIGS. 1 through 4, one shell 41 of the one pair of shells 41 and 44 has an interleaving plurality of bent pieces 410 on a periphery. The bent pieces 410 face an edge portion of the frame 1. Moreover, on a front end portion of one of the bent pieces 410 is established a stopper 40 which protrudes from a plate thickness surface (a flat side). Furthermore, the bent pieces 410 are partially inserted into the frame 1 with inclusion of the stoppers 40, after application of pressure and ultrasonic vibration to the front end portion of the edge portion of the frame 1, and are joined to the frame 1.

In reference to FIGS. 1 through 3, the connector 3 has a housing 31 and a plurality of connectors 32. The housing 31 is covered on both faces by the one pair of shells 41 and 44. The contacts 32 are arranged in parallel on an interior portion of the housing 31. Moreover, one end portion of the contacts 32 is connected to an external terminal which is not shown, and another end portion is connected to the printed circuit board 2.

In reference to FIGS. 1 through 3, the frame 1, which is insert molded with the shell 44, is constituted by one pair of casing boards 1a and 1b extending substantially parallel, and a casing board 1c which joins base end sections of each of the one pair of casing boards 1a and 1b. In addition, the front end portions of the one pair of casing boards 1a and 1b fit together with both wings of the connector 3, and constitute an outer border of the IC card 101. Furthermore, the one pair of shell plates 41 and 42 covers the frame 1 and the connector 3, and thus constitutes an outer shell of the IC card 101.

In reference to FIGS. 1 through 4, the one pair of shell plates 41 and 44 is formed by a metal plate of thin plate thickness.

Moreover, for the one pair of shell plates 41 and 44, the perimeters are bent perpendicularly. One shell 41 is interleavedly latched onto a plate thickness surface of the frame 1 and the connector 3.

In reference to FIGS. 2 and 3, the one pair of shells 41 and 44 covers both faces of the printed circuit board 2, mechanically joining the connector 3 and the frame 1. The one pair of shells 41 and 44 may constitute an outer shell of the IC card 101, and using a metal plate having conductivity, also functions as shielding plates blocking unwanted electromagnetic waves.

In reference to FIGS. 1 through 4, in the embodiment, the one pair of shells 41 and 44 use stainless steel plates having a corrosion-preventing effect; however, for example, steel plates coated with chrome are also acceptable. Furthermore, for the one pair of shell plates 41 and 44, in order to prevent the inner wall thereof from short circuiting to the pattern side (wired side) of the printed circuit board 2, insulating films 4a and 4b may be partially applied (see FIG. 3).

In reference to FIGS. 1 and 3, the contact 32 uses a plate contact that extends in a band. Additionally, in order physically to prevent exposure of the plurality of plate contacts 32, shrouds 31a and 32b that form a rectangular opening may be installed in the housing 31. One end portion of the contacts 32 is arranged in parallel to the one set of shrouds 31a and 31b.

In reference to FIG. 3, on another end portion of the contacts 32 is established a lead portion which protrudes from the housing 31. Additionally, by "soldering" a lead portion 32r to an edge connector 2e installed on the printed circuit board 2, the printed circuit board 2 can be fixed to the connector 3.

In reference to FIG. 4, the stoppers 40 protrude from a plate thickness surface (a flat side) of the bent pieces 410. In the first embodiment of the present invention, the stoppers 40 include one pair of hook pieces 411 and 411 in which both wings of the front end portions of the bent pieces 410 are bent and are opposed to each other. In this embodiment, for the one pair of hook pieces 411 and 411, both wings of the front end portion of the bent pieces 410 are bent toward an inner side of the shell 41 and oppose each other.

In reference to FIG. 4, for the one pair of hook pieces 411 and 411, press-molding is preliminarily performed on the developed metal plate, and then the interleaving bent pieces 410 are processed by bending, enabling obtaining the shell 41 which is shown. From the developed metal plate, the one pair of hook pieces 411 and 411 and the interleaving bent pieces 410 may be integrally formed.

Next, an operation of an IC card according to the first embodiment of the present invention is explained.

In FIGS. 1 through 4, if ultrasonic vibration is applied to a front end portion of the bent pieces 410 while an edge portion of the frame 1 is subjected to pressure, friction occurs between the front end portion of the bent pieces 410 and the frame 1, and a portion of the frame 1 fluidizes, allowing the bent pieces 410 including the one pair of hook pieces 411 and 411 to be inserted partially into the frame 1. Then, as a result of solidification of the fluidized portion, the bent pieces 410 can be joined to the frame 1 and the connector 3.

In the IC card 101 according to the first embodiment of the present invention, the bent pieces 410, which include the one pair of hook pieces 411 and 411, are joined by ultrasonic welding to an edge portion of the frame 1, and therefore, compared to a conventional IC card, it is possible to join a frame to a shell with sufficient joining strength. The reason is that the one pair of hook pieces 411 and 411 protrudes from a plate thickness surface of the bent pieces 410, and therefore, it is difficult for the shell 42 to separate from the frame 1.

The IC card 101 according to the first embodiment of the present invention can reduce deformation caused by bending or twisting affecting the IC card 101 by constituting a three-dimensional protrusion on a front end portion of the interleaving bent pieces 410, thereby increasing a joining strength of the shell 41.

Second Embodiment

Next, a configuration of an IC card according to the second embodiment of the present invention is explained.

Figure 5:
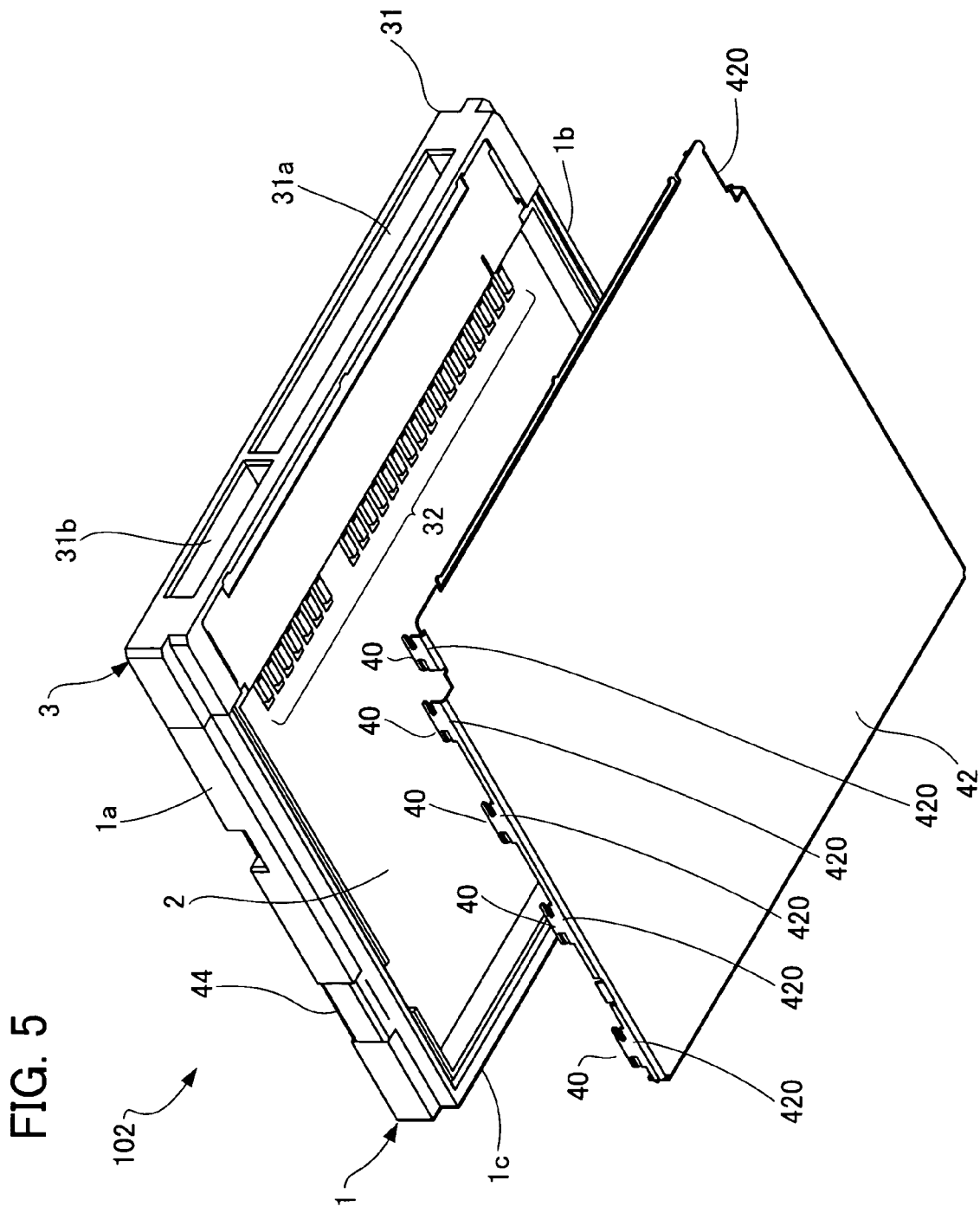
FIG. 5 is a perspective view showing an exterior of an IC card according to a second embodiment of the present invention.
Figure 6:
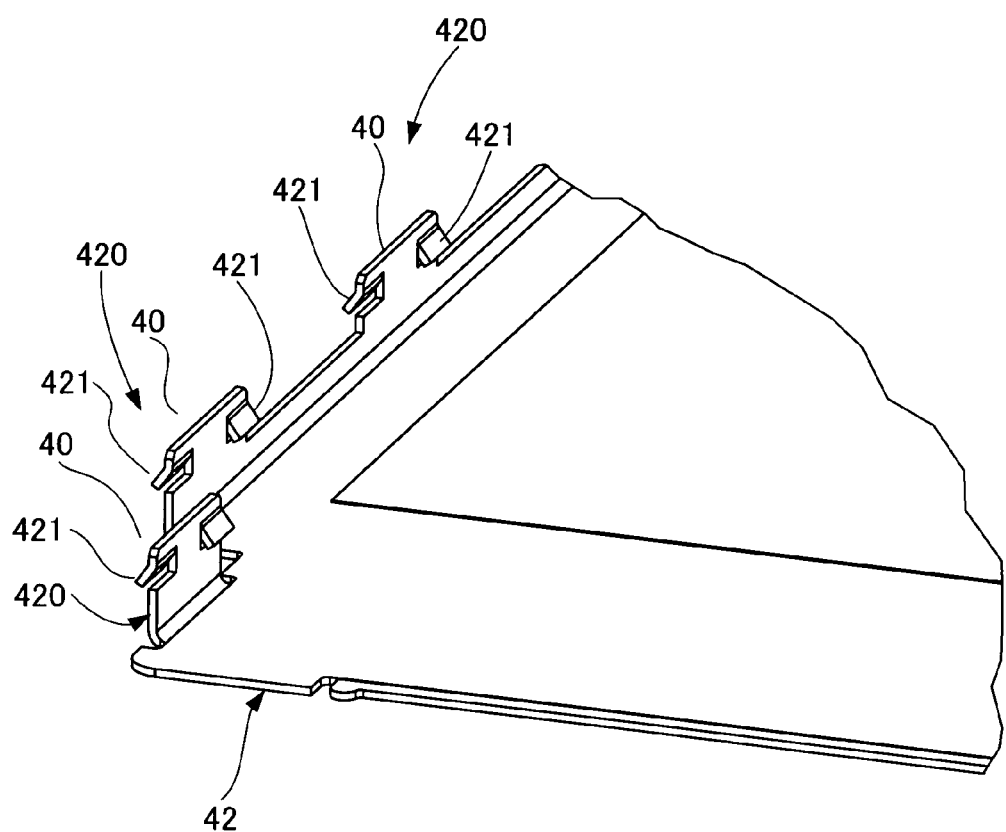
FIG. 6 is a perspective view showing an exterior of a main portion of one shell equipped to the IC card according to the second embodiment.

FIG. 5 is a perspective view showing an exterior of an IC card according to the second embodiment of the present invention. FIG. 6 is a perspective view showing an exterior of a main portion of one shell equipped to the IC card according to the second embodiment.

It should be noted that, in the explanation below, for components having the same symbols as symbols used in the explanation of the first embodiment, operation is assumed to be the same, and therefore, there are cases in which explanations thereof may be omitted. Furthermore, for one shell 42 shown in FIGS. 5 and 6, only the stoppers 40 including the one pair of hook pieces 411 and 411 have been changed to stoppers 40 including inclined pieces 421 and 421.

In reference to FIG. 5, the IC card 102 according to the second embodiment of the present invention has a frame 1 of a rectangular border-shape, a printed circuit board 2, a plate-shaped connector 3, and one pair of shell plates 42 and 44.

In reference to FIG. 5, the frame 1 is composed of synthetic resin and is open on one side. The printed circuit board 2 is disposed on an interior portion of the frame 1, and equips an electronic component which is not shown. The connector 3 constitutes one side of the frame 1. The one pair of shells 42 and 44 are composed of metal plate, cover the area surrounded by the frame 1 with both faces of the shells 42 and 44, and constitute an outer shell of the IC card 102.

In reference to FIGS. 5 and 6, one shell 42 of the one pair of shells 42 and 44 has an interleaving plurality of bent pieces 420 on a periphery. The bent pieces 420 face an edge portion of the frame 1. Moreover, on a front end portion of one of the bent pieces 420 are established stoppers 40 that protrude from a plate thickness surface (a flat side) thereof. Furthermore, the bent pieces 420 are partially inserted into the frame 1 with inclusion of the stoppers 40, after application of pressure and ultrasonic vibration to the front end portion of the edge portion of the frame 1, and are joined to the frame 1.

In reference to FIG. 5, the one pair of shells 42 and 44 covers both faces of the printed circuit board 2, mechanically joining the connector 3 and the frame 1. The one pair of shells 42 and 44 may constitute an outer shell of the IC card 102, and using a metal plate having conductivity, also functions as shielding plates blocking unwanted electromagnetic waves.

In reference to FIG. 6, the stoppers 40 protrude from a plate thickness surface of the bent pieces 420. In the second embodiment of the present invention, the stoppers 40 include one pair of inclined pieces 421 and 421 which are shaped such that an angle opens from a front end portion of the bent pieces 420 facing toward a base end portion thereof. In this embodiment, the one pair of inclined pieces 421 and 421 are shaped such that an angle opens in a reverse direction from a front end portion of each of the bent pieces 420 which faces toward a base end portion thereof, respectively.

In reference to FIG. 6, for the one pair of inclined pieces 421 and 421, press-molding is preliminarily performed on the developed metal plate, and then the interleaving bent pieces 420 are processed by bending, enabling the shell 42, which is shown, to be obtained. From the developed metal plate, the one pair of inclined pieces 421 and 421 and the interleaving bent pieces 420 may be integrally formed.

Next, an operation of an IC card according to the second embodiment of the present invention is explained.

In reference to FIGS. 5 and 6, if ultrasonic vibration is applied to a front end portion of the bent pieces 420 while an edge portion of the frame 1 is subjected to pressure, friction occurs between the front end portion of the bent pieces 420 and the frame 1, and a portion of the frame 1 fluidizes, allowing the bent pieces 420 including the one pair of inclined pieces 421 and 421 to be inserted partially into the frame 1. Then, as a result of solidification of the fluidized portion, the bent pieces 420 can be joined to the frame 1 and the connector 3.

In the IC card 102 according to the second embodiment of the present invention, the bent pieces 420 which include the one pair of inclined pieces 421 and 421 are joined by ultrasonic welding to an edge portion of the frame 1, and therefore, compared to a conventional IC card, it is possible to join a frame to a shell with sufficient joining strength. The reason is that the one pair of inclined pieces 421 and 421 protrudes from a plate thickness surface of the bent pieces 420, and therefore, it is difficult for the shell 42 to separate from the frame 1.

The IC card 102 according to the second embodiment of the present invention can reduce deformation caused by bending or twisting affecting the IC card 102 by constituting a lancet-shaped protrusion (a lance) on a front end portion of the interleaving bent pieces 420, thereby increasing a joining strength of the shell 42.

Third Embodiment

Next, an operation of an IC card according to a third embodiment of the present invention is explained.

Figure 7:
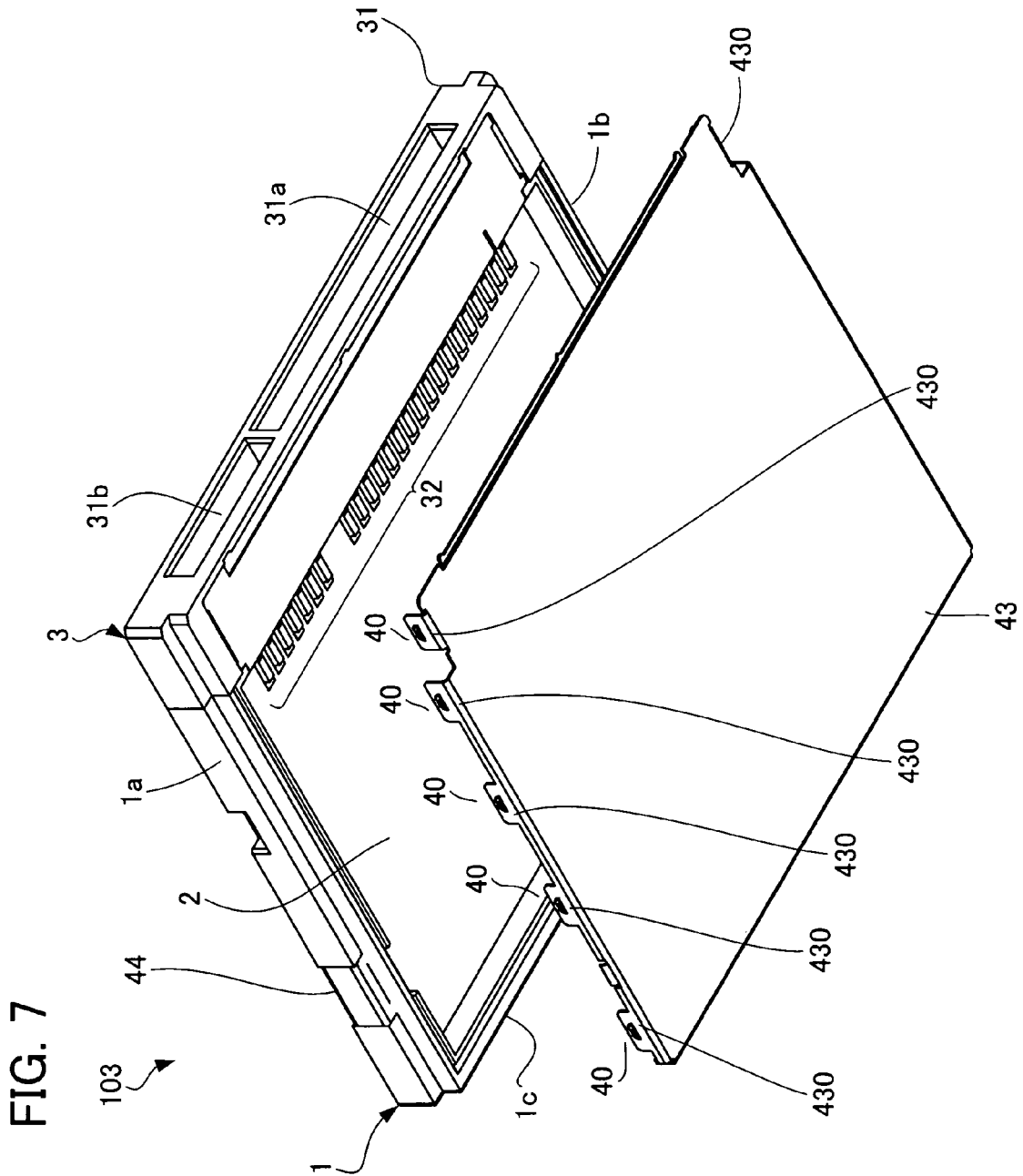
FIG. 7 is a perspective view showing an exterior of an IC card according to a third embodiment of the present invention.
Figure 8:
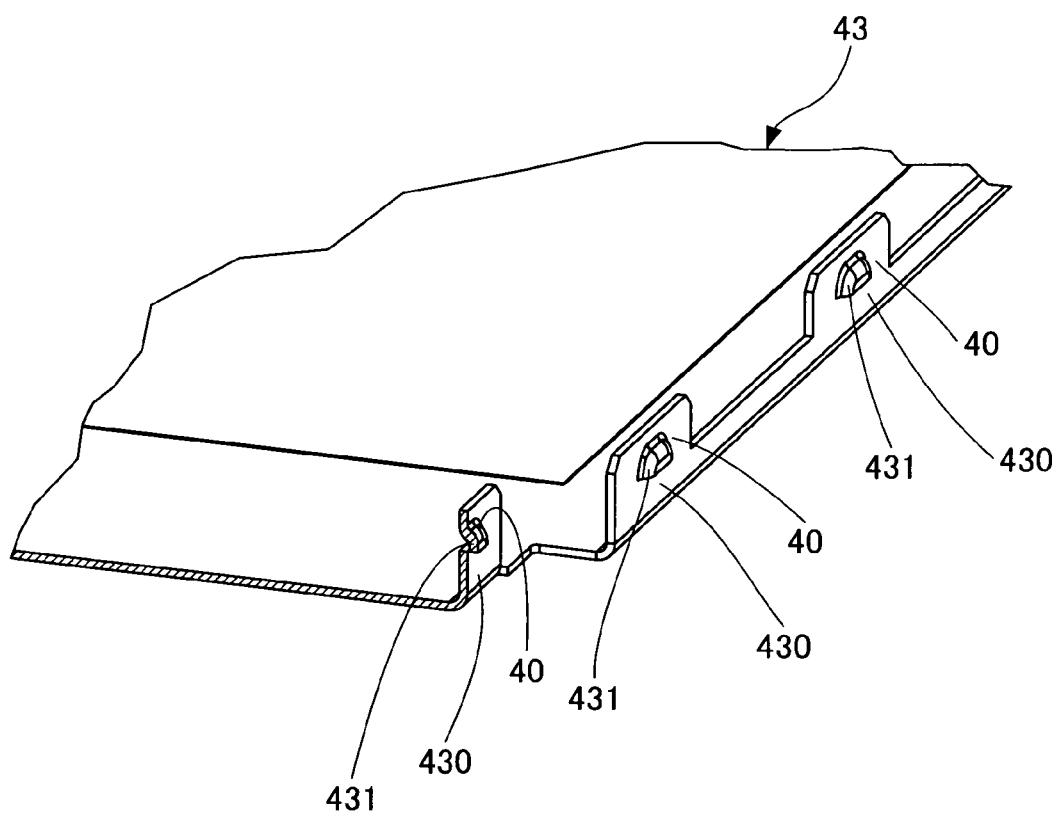
FIG. 8 is a perspective view showing an exterior of a main portion of one shell equipped to the IC card according to the third embodiment.

FIG. 7 is a perspective view showing an exterior of an IC card according to the third embodiment of the present invention. FIG. 8 is a perspective view showing an exterior of a main portion of one shell equipped to the IC card according to the third embodiment.

It should be noted that, in the explanation below, for components having the same symbols as symbols used in the explanation of the first embodiment, operation is assumed to be the same, and therefore, there are cases in which explanations thereof may be omitted. Furthermore, for one shell 43 shown in FIGS. 7 and 8, only the stoppers 40 include the one pair of hook pieces 411 and 411 have been changed to stoppers 40 including an embossment 431.

In reference to FIG. 7, the IC card 103 according to the third embodiment of the present invention has a frame 1 of a rectangular border-shape, a printed circuit board 2, a plate-shaped connector 3, and one pair of shell plates 43 and 44.

In reference to FIG. 7, the frame 1 is composed of synthetic resin and is open on one side. The printed circuit board 2 is disposed on an interior portion of the frame 1, and equips an electronic component which is not shown. The connector 3 constitutes one side of the frame 1. The one pair of shells 43 and 44 are composed of metal plate, cover the area surrounded by the frame 1 with both faces of the shells 43 and 44, and constitute an outer shell of the IC card 103.

In reference to FIGS. 7 and 8, one shell 43 of the one pair of shells 43 and 44 has an interleaving plurality of bent pieces 430 on a periphery. The bent pieces 430 face an edge portion of the frame 1. Moreover, on a front end portion of one of the bent pieces 430 are established stoppers 40 that protrude from a plate thickness surface (a flat side) thereof. Furthermore, the bent pieces 430 are partially inserted into the frame 1 with inclusion of the stoppers 40, after application of pressure and ultrasonic vibration to the front end portion of the edge portion of the frame 1, and are joined to the frame 1.

In reference to FIG. 7, the one pair of shells 43 and 44 covers both faces of the printed circuit board 2, mechanically joining the connector 3 and the frame 1. The one pair of shells 43 and 44 may constitute an outer shell of the IC card 103, and using a metal plate having conductivity, also functions as shielding plates blocking unwanted electromagnetic waves.

In reference to FIG. 8, the stoppers 40 protrude from a plate thickness surface of the bent pieces 430. In the third embodiment of the present invention, the stoppers 40 have a curved surface on a front end portion of the bent pieces 430, and include an embossment 431 having a difference in level on a base end portion of the bent pieces 430. In this embodiment, the embossment 431 is established so as to protrude on an external side of the shell 43.

In reference to FIG. 8, for the embossment 431, embossing is preliminarily performed on the developed metal plate, and then the interleaving bent pieces 430 are processed by bending, enabling the shell 43, which is shown, to be obtained. The embossment 431 and the interleaving bent pieces 430 may be integrally formed from the developed metal plate.

Next, an operation of an IC card according to the third embodiment of the present invention is explained.

In FIGS. 7 and 8, if ultrasonic vibration is applied to a front end portion of the bent pieces 430 while an edge portion of the frame 1 is subjected to pressure, friction occurs between the front end portion of the bent pieces 430 and the frame 1, and a portion of the frame 1 fluidizes, allowing the bent pieces 430 including the embossment 431 to be inserted partially into the frame 1. Then, as a result of solidification of the fluidized portion, the bent pieces 430 can be joined to the frame 1 and the connector 3.

In the IC card 103 according to the third embodiment of the present invention, the bent pieces 430, which include the embossment 431, are joined by ultrasonic welding to an edge portion of the frame 1, and therefore, compared to a conventional IC card, it is possible to join a frame to a shell with sufficient joining strength. The reason is that the embossment 431 protrudes from a plate thickness surface of the bent pieces 430, and therefore, it is difficult for the shell 43 to separate from the frame 1.

The IC card 103 according to the third embodiment of the present invention can reduce deformation caused by bending or twisting affecting the IC card 103 by constituting an embossment having a difference in level on a front end portion of the interleaving bent pieces 430, thereby increasing a joining strength of the shell 43.

Heretofore, as shown in each embodiment, according to the IC card of the present invention, a shell has bent pieces which include stoppers, and is joined by ultrasonic welding to an edge portion of the frame using the bent pieces and the stoppers. As a result, compared to a conventional IC card, it is possible to join a frame to a shell with sufficient joining strength. The reason is that the stoppers protrude from a plate thickness surface (a flat side) of the bent pieces, and therefore, it is difficult for the shell to separate from the frame.

What is claimed is:

1. An IC card, comprising:
   a frame of a rectangular border-shape composed of synthetic resin;
   a printed circuit board that is disposed on an interior portion of the frame and equips an electronic component; and
   one pair of shells that constitutes an outer shell, the shells being composed of a metal plate, and covers an area surrounded by the frame, wherein:
   the one pair of shells comprises a first shell and a second shell, the first shell which is formed by insert molding with the frame, the second shell is processed separately from the frame without insert molding with the frame and has a plurality of bent pieces, which are intermittent, facing an edge portion of the frame of the first shell on a periphery thereof, one of the bent pieces establishes a stopper that protrudes from a plate thickness surface thereof on a front end portion, and the plurality of bent pieces are joined to the frame of the first shell by solidification of the synthetic resin of the edge portion of the frame, partially fluidized by application of pressure and ultrasonic vibration to the front end portion of the edge portion of the frame, after the bent pieces including the stopper are partially inserted into the frame fluidized resin.

2. The IC card according to claim 1, the stopper includes one pair of hook pieces opposing each other at which both wings of the front end portions of the bent pieces are bent.

3. The IC card according to claim 1, wherein the stopper includes one pair of inclined pieces that opens at an angle from a front end portion of the bent pieces facing toward a base end portion thereof.

4. The IC card according to claim 1, wherein the stopper has a curved surface on a front end portion of the bent pieces, and includes a difference in level on a base end portion of the bent pieces.

5. An IC card, comprising:

a frame of a rectangular border-shape composed of synthetic resin;

a printed circuit board that is disposed on an interior portion of the frame and equips an electronic component;

a housing having a shroud and a plurality of contacts connecting the printed circuit board, arranged in the shroud; and one pair of shells that constitutes an outer shell, the shells being composed of a metal plate, and covers an area surrounded by the frame, wherein:

the one pair of shells comprises a first shell and a second shell, the first shell which is formed by insert molding with the frame, the second shell is processed separately from the frame without insert molding with the frame and has a plurality of bent pieces, which are intermittent, facing an edge portion of the frame of the first shell on a periphery thereof, one of the bent pieces establishes a stopper that protrudes from a plate thickness surface thereof on a front end portion, and the plurality of bent pieces are joined to the frame of the first shell by solidification of the synthetic resin of the edge portion of the frame, partially fluidized by application of pressure and ultrasonic vibration to the front end portion of the edge portion of the frame, after the bent pieces including the stopper are partially inserted into the frame fluidized resin.

6. An IC card, comprising:

a frame of a rectangular border-shape composed of synthetic resin;

a printed circuit board that is disposed on an interior portion of the frame and equips an electronic component;

a housing having a shroud and a plurality of contacts connecting the printed circuit board, arranged in the shroud; and one pair of shells that constitutes an outer shell, the shells being composed of a metal plate, and covers an area surrounded by the frame, wherein:

the one pair of shells comprises a first shell and a second shell, the first shell which is formed by insert molding with the frame, the second shell is processed separately from the frame without insert molding with the frame and has a plurality of bent pieces, which are intermittent, facing an edge portion of the frame of the first shell on a periphery thereof, the plurality of bent pieces of the second shell is arranged by having more than two bent pieces in one side of the periphery of the second shell, one of the bent pieces establishes a stopper that protrudes from a plate thickness surface thereof on a front end portion, and the plurality of bent pieces are joined to the frame of the first shell by solidification of the synthetic resin of the edge portion of the frame, partially fluidized by application of pressure and ultrasonic vibration to the front end portion of the edge portion of the frame, after the bent pieces including the stopper are partially inserted into the frame fluidized resin.

* * * * *